US012003982B2

(12) United States Patent
Medithe et al.

(10) Patent No.: US 12,003,982 B2
(45) Date of Patent: Jun. 4, 2024

(54) COMPUTER DEVICE, METHOD, AND NON-TRANSITORY COMPUTER READABLE MEDIUM FOR ANALYZING THE IMPACT OF OUTAGE EVENTS IN A WIRELESS COMMUNICATIONS NETWORK

(71) Applicant: RAKUTEN MOBILE, INC., Tokyo (JP)

(72) Inventors: Madhukiran Medithe, Tokyo (JP); Suvindu Chinnam, Tokyo (JP); Petrit Nahi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 344 days.

(21) Appl. No.: 17/454,622

(22) Filed: Nov. 12, 2021

(65) Prior Publication Data

US 2022/0272550 A1    Aug. 25, 2022

Related U.S. Application Data

(60) Provisional application No. 63/151,571, filed on Feb. 19, 2021.

(51) Int. Cl.
*H04W 24/04* (2009.01)
*G06F 16/903* (2019.01)
*H04W 8/00* (2009.01)
*H04W 8/08* (2009.01)

(52) U.S. Cl.
CPC ...... *H04W 24/04* (2013.01); *G06F 16/90335* (2019.01); *H04W 8/005* (2013.01); *H04W 8/08* (2013.01)

(58) Field of Classification Search
CPC ....... H04W 24/04; H04W 8/005; H04W 8/08; H04W 8/20; H04W 88/08; G06F 16/90335
See application file for complete search history.

(56) References Cited

U.S. PATENT DOCUMENTS

| 2014/0029439 | A1* | 1/2014 | Shaw | H04W 24/08 370/241 |
| 2015/0288560 | A1* | 10/2015 | Shaw | H04L 41/5025 370/216 |
| 2017/0094537 | A1* | 3/2017 | Yang | H04L 41/0631 |
| 2017/0347292 | A1* | 11/2017 | Ho | H04W 36/0083 |
| 2019/0223031 | A1* | 7/2019 | Zou | H04W 52/0206 |

* cited by examiner

*Primary Examiner* — Ian N Moore
*Assistant Examiner* — Latresa A McCallum
(74) *Attorney, Agent, or Firm* — HAUPTMAN HAM, LLP

(57) ABSTRACT

Systems and methods for analyzing the impact of outage events in a wireless communications network are disclosed. In some embodiments, the method includes obtaining outage data that indicates that an outage event occurred at a base station. A first set of either expected or real time connected user devices prior to the outage event are identified. A first subset of the first set of user devices that are wirelessly connected to any of the plurality of base stations other than the first base station during the outage event are identified. Furthermore, a second subset of the first set of user devices that are not connected to any of the plurality of base stations during the outage event are identified. In this manner, the impact of the outage event can be analyzed to allow for service providers to reduce the negative effects of future outage events.

20 Claims, 12 Drawing Sheets

COMPUTER DEVICE, METHOD, AND NON-TRANSITORY COMPUTER READABLE MEDIUM FOR ANALYZING THE IMPACT OF OUTAGE EVENTS IN A WIRELESS COMMUNICATIONS NETWORK

PRIORITY CLAIM AND CROSS-REFERENCE

This application claims priority to Provisional Application No. 63/151,571, filed Feb. 19, 2021, which is hereby incorporated by reference in its entirety.

BACKGROUND

Cellular Network Service Providers strive to provide highly reliable, good quality and efficient network connectivity in cellular service through their wireless communications networks. However, outage events in the radio access network or in the core network result in service failures or degradations in connectivity. Understanding the effects of the outage events on service is important in order for service providers to prevent or reduce the negative impact of outage events.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
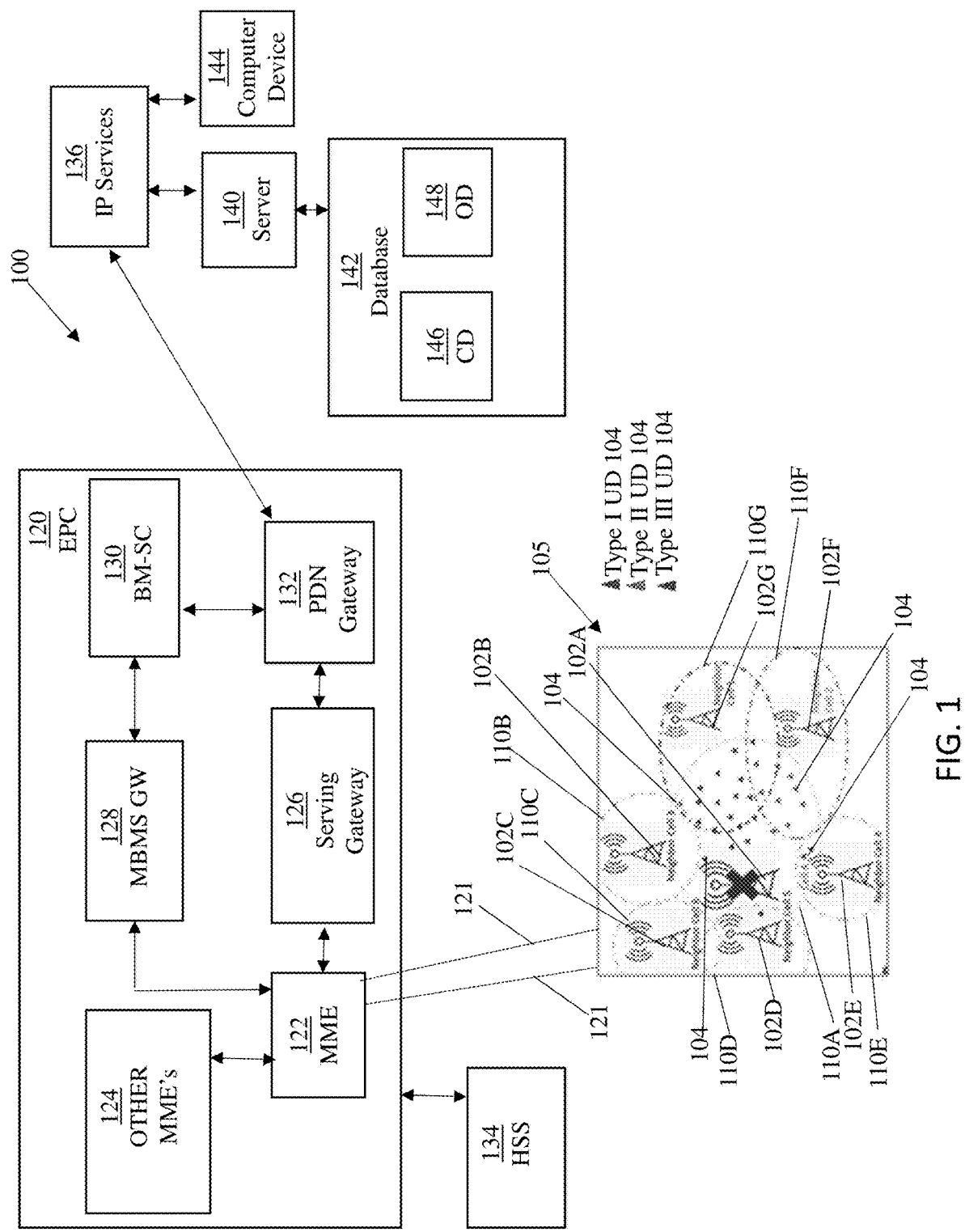
FIG. 1 is a diagram of a wireless communications system in accordance to some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a method, a computer device, and a non-transitory computer readable medium for analyzing the impact of outage events in a wireless communications network are disclosed. In some embodiments, the method includes obtaining, at a computer device, outage data that indicates that an outage event occurred at a BS. A first set of user devices that where either expected user devices that are expected to be connected to the first BS before the outage event or real time connected user devices that actually are wirelessly connected to the first base state prior to the outage event. A first subset of the first set of user devices that are wirelessly connected to any of at least one of the plurality of BSs other than the first BS during the outage event are identified. Furthermore, a second subset of the first set of user devices that are not connected to any of the plurality of BSs during the outage event are identified. In this manner, the impact of the outage event can be analyzed to allow for service providers to reduce the negative effects of future outage events.

FIG. 1 is a diagram of a wireless communications system 100. The wireless communications system 100 (also referred to as a wireless wide area network (WWAN)).

The wireless communications system 100 includes BSs (referred to generically as BS(s) 102 and specifically as BSs 102A-102G) and user devices (UDs) 104 (not all labeled for the sake of clarity) that make up a radio access network (RAN) 105. The wireless communication system 100 also includes an Evolved Packet Core (EPC) 120. The BSs 102 may include macro cells (high power cellular BS) and/or small cells (low power cellular BS). The macro cells include BSs. The small cells include femtocells, picocells, and microcells.

The BSs 102 (collectively referred to as Evolved Universal Mobile Telecommunications System (UMTS) Terrestrial Radio Access Network (E-UTRAN)) interface with the EPC 120 through backhaul links 121 (e.g., S1 interface). In addition to other functions, the BSs 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BSs 102 may communicate directly or indirectly (e.g., through the EPC 120) with each other over backhaul links (e.g., X2 interface). The backhaul links may be wired or wireless.

The BSs 102 may wirelessly communicate with the UDs 104. Each of the BSs 102 provide communication coverage for a respective geographic coverage area (referred to generically as coverage area(s) 110 and specifically as coverage areas 110A-110G). In some embodiments, adjacent coverage areas 110 partially overlap. In FIG. 1, the BSs 102B-102G are all BSs that neighbor the BS 102A. In this example, the coverage areas 110B-110G of BSs 102B-102G, each partially overlap the coverage area 110A of the BS 102A. A network that includes both small cell and macro cells may be known as a heterogeneous network. A heterogeneous network may also include Home Evolved Node Bs (eNBs) (HeNBs)), which may provide service to a restricted group known as a closed subscriber group (CSG). The communication links between the BSs 102 and the UDs 104 may include uplink (UL) (also referred to as reverse link) transmissions from a UD 104 to a BS 102 and/or downlink (DL) (also referred to as forward link) transmissions from a BS 102 to a UD 104. The communication links may use multiple-input and multiple-output (MIMO) antenna technology, including spatial multiplexing, beamforming, and/or transmit diversity. The communication links may be through one or more carriers. The BSs 102/UDs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In some embodiments, certain UDs 104 communicate with each other using device-to-device (D2D) communication link. The D2D communication link use the DL/UL WWAN spectrum. The D2D communication link may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system further include a Wi-Fi access point (AP) in communication with Wi-Fi stations (STAs) via communication links in a 5 GHz unlicensed frequency spectrum. When communicating in an unlicensed frequency spectrum, the STAs perform a clear channel assessment (CCA) prior to communicating in order to determine whether the channel is available.

The small cell may operate in a licensed and/or an unlicensed frequency spectrum. When operating in an unlicensed frequency spectrum, the small cell employ NR and use the same 5 GHz unlicensed frequency spectrum as used by the Wi-Fi AP. The small cell, employing NR in an unlicensed frequency spectrum, may boost coverage to and/or increase capacity of the access network.

In some embodiments, a gNodeB (gNB) in the hetrogenous network operate in millimeter wave (mmW) frequencies and/or near mmW frequencies in communication with the UD 104. When the gNB operates in mmW or near mmW frequencies, the gNB may be referred to as an mmW BS. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In some embodiments, at least some of the BSs 102 are mmW BS utilize beamforming with the UD 104 to compensate for the extremely high path loss and short range.

In some embodiments, the EPC 120 includes a Mobility Management Entity (MME) 122, other MMEs 124, a Serving Gateway 126, a Multimedia Broadcast Multicast Service (MBMS) Gateway 128, a Broadcast Multicast Service Center (BM-SC) 130, and a Packet Data Network (PDN) Gateway 132. The MME 122 may be in communication with a Home Subscriber Server (HSS) 134. The MME 122 is the control node that processes the signaling between the UDs 104 and the EPC 120. Generally, the MME 122 provides bearer and connection management. All user Internet protocol (IP) packets are transferred through the Serving Gateway 126, which itself is connected to the PDN Gateway 132. The PDN Gateway 132 provides UD IP address allocation as well as other functions. The PDN Gateway 132 and the BM-SC 130 are connected to the IP Services 136. In some embodiments, the IP Services 136 includes the Internet, an intranet, an IP Multimedia Subsystem (IMS), a PS Streaming Service, and/or other IP services. The BM-SC 130 provides functions for MBMS user service provisioning and delivery. In some embodiments, the BM-SC 130 serves as an entry point for content provider MBMS transmission, may be used to authorize and initiate MBMS Bearer Services within a public land mobile network (PLMN), and may be used to schedule MBMS transmissions. In some embodiments, the MBMS Gateway 128 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

In some embodiments, the BS may also be referred to as a gNB, Node B, evolved Node B (eNB), an access point, a base transceiver station, a radio BS, a radio transceiver, a transceiver function, a basic service set (BSS), an extended service set (ESS), or some other suitable terminology. The BS 102 provides an access point to the EPC 120 for a UD 104. Examples of UDs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UDs 104 may be referred to as IoT devices (e.g., parking meter, gas pump, toaster, vehicles, etc.). The UD 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In FIG. 1, a server 140 is connected to the EPC 120 through the IP services 104. The server 104 operates a database 142. The RAN 105 and the EPC 120 transmit data to the server 140 regarding the operation of the RAN 105 and the EPC 120. The server 140 is then configured to administer the data and store the data in the database 142. A computer device 144 is configured to submit search requests to the server 140 through the IP services 136 to obtain data from the database 142. In some embodiments, a user logs into an account by providing credentials to obtain data from the database 142. In other embodiments, the computer device 142 implements a software application that makes search requests to the server 140 through the IP Services 136 to obtain data from the database 142.

In this embodiment, the database is configured to store connectivity data 146. Connectivity data 146 is data that describes the connection of the UDs 104 to the wireless communications system 100. In some embodiments, the connectivity data 146 includes connectivity times for the different UDs 104 to the BSs 102, of CELL TRACE logs, CORE traces, connectivity quality parameters (e.g., RSRP, MCS, CQI), location data of the UDs 104, and/or the like. Furthermore, the database 146 is also configured to store outage data 148. The outage data 148 indicates that an outage event occurred at one or more of the BSs 102 and a time period that the outage event occurred at the BS(s) 102. In some embodiments, the connectivity data 146 identifies UDs 104 through an identification numbers such as an international mobile subscriber identity (IMSI).

The computer device 142 is configured to implement computer executable instructions (i.e., software) that analyze the impact of the outage event on the UD 104. In the following non-limiting example provided in FIG. 1, it is assumed than an outage event occurred at the BS 102A. In some embodiments, the outage event at the BS 102A which is the result of an outage in the RAN 105. In other embodiments, the outage event at the BS 102A is the result of an outage in the EPC 120.

In some embodiments, the outage event impacts the continuous service to UDs 104 that are in different modes of connectivity prior to the outage event occurring. The UDs 104 shown in FIG. 1 were all wirelessly connected to the BS 102A during a time period of normal operation before the time period of the outage event. Once the outage event occurs, some of the UDs 104 connect to neighboring BSs 102B-102G that are still operating normally while other UDs 104 do not connect to any of the BSs 104 and thus have no connectivity. For example, once the outage event occurs, the type I UDs 104 are in the coverage area 110G because they are in the area of overlap between the coverage areas 110A, 110G. At least some of the type I UDs 104 therefore wirelessly connect to the BS 102G during the time period of the outage event. Furthermore, once the outage event occurs, the type II UDs 104 are in the coverage area 110F because they are in the area of overlap between the coverage areas 110A, 110F. At least some of the type II UDs 104 therefore wirelessly connect to the BS 102F during the time period of the outage event. The Type III UDs 104 do not connect to any of the BSs 104 and therefore have no connectivity to the RAN 105. Furthermore, while at least some of the type I and type II UDs connect to the neighboring BSs 102F, 102G, there can be other negative impacts on their connectivity. For example, some of the type I and type II UDs connect to the neighboring BSs 102F, 102G with good connectivity while other experience poor connectivity.

In some embodiments, the software is implemented on a Data Science Platform by the computer device 140. In some embodiments, software is configured to analyze the connectivity impact of the outage event on three different population types of UDs 104, which are listed below:

Active Real Time Connected UDs 104: Active Real Time Connected UDs 104 who were connected to the BS 102 before the outage event. The impact of the outage event on real time connected users is observed during a portion or the entire time period of the outage event.

Expected UDs 104: UDs 104 that that are expected to be connected to the BS 102A during a time period of the outage event. In some embodiments, whether the UDs 104 are expected to wirelessly connect to the BS 102 is based on pattern recognition of the behavior (e.g. mobility, coverage, serving cells, traffic, etc.) of the UDs 104 in the wireless communication system 100. The impact of the outage event on expected UDs 104 is observed during a portion or the entire time period of the outage event.

Idle Real Time Connected UDs 104: UD's in an inactive state/idle state transmit a tracking area update to the BS 102A within a scheduled time period. If the wireless communications network 100 did not receive tracking area update request during the scheduled time period, the UDs 104 do not have access to the wireless communications network 100. The impact of the outage event on idle real time connected UDs 104 is observed during a portion or the entire time period of the outage event.

Figure 2:
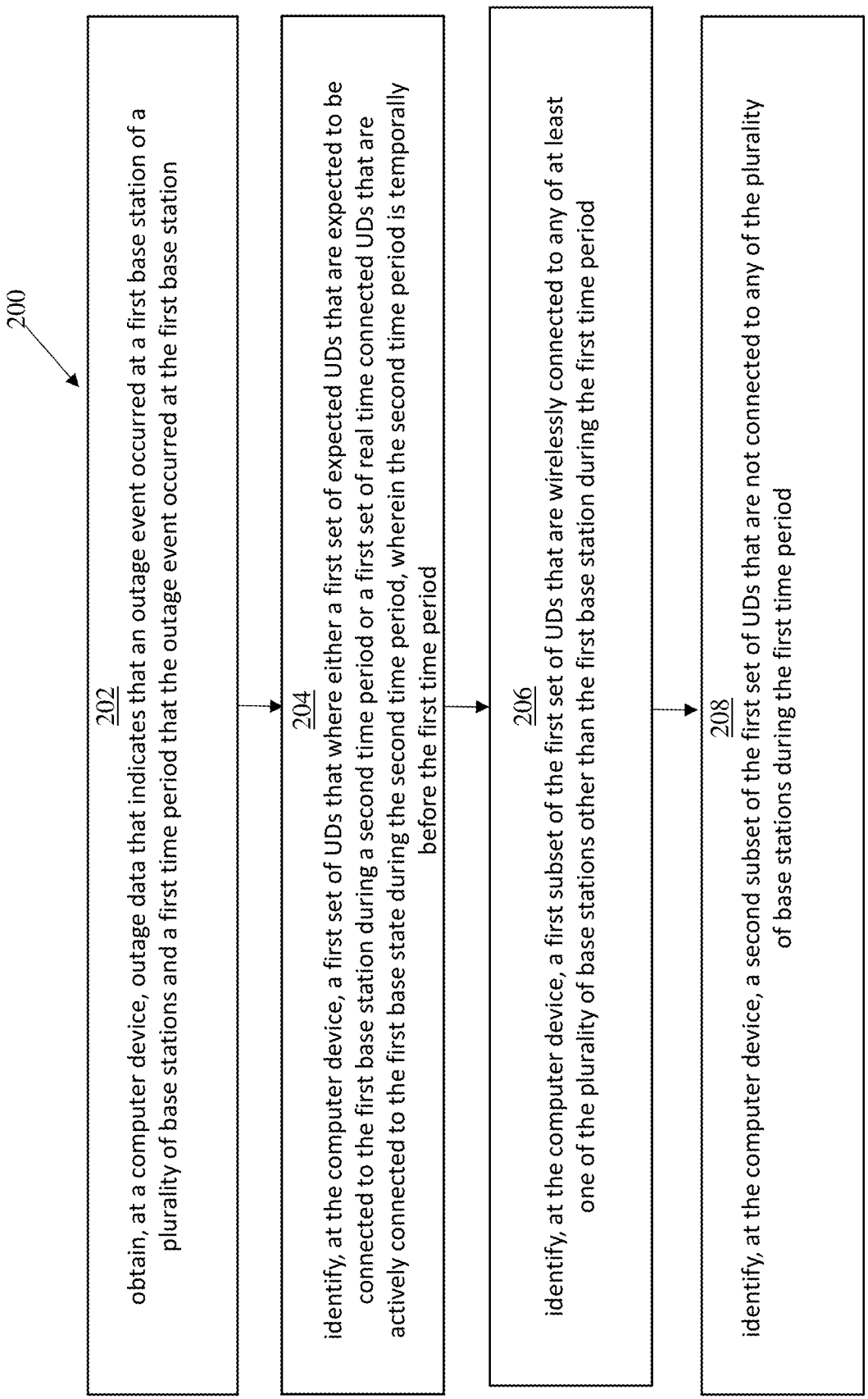
FIG. 2 is a flowchart illustrating one embodiment of a computerized method in accordance to some embodiments.

FIG. 2 is a flowchart illustrating one embodiment of a computerized method.

In some embodiments, the computer device 144 implements the method. At block 202, outage data 148 is obtained at the computer device 144 that indicates that an outage event occurred at the BS 102A of the plurality of BSs 102 and a first time period that the outage event occurred at the BS 102A. The first time period begins at a first start time that indicates when the outage event began and ends at a first end time that indicates when the outage event ended.

At block 204, a first set of UDs 104 are identified at the computer device that where either a first set of expected UDs 104 that are expected to be connected to the first BS 102A during a second time period or a first set of real time connected UDs 104 that are actively connected to the first base state during the second time period. Essentially, this is the population of UDs 104 that either are or are expected to be wirelessly connected to the BS 102A before the outage event. Thus, the second time period is temporally before the first time period. In some embodiments, the second time period begins at a second start time before the first start time and ends at a second end time that is approximately at the first start time. Thus, in some embodiments, the second time period is the time period immediately before the outage event at the BS 102A. It is this set of either expected or (idle or active) real time UDs 104 that either will or are most likely to be impacted by the outage event.

At block 206, a first subset of the first set of UDs (e.g., type I, II UDs 104) are identified that are wirelessly connected to any of at least one of the plurality of BSs (e.g., BSs 102F, 102G) other than the BS 102A during the first time period. In other words, the UDs 104 that manages to become connected to other BSs 102 are determined. As explained in further detail below, the analysis goes further in some embodiments and the computer device 144 determines whether these UDs 104 that managed to connect to other BSs 102 had good connectivity or bad connectivity.

At block 208, a second subset of the first set of UDs (e.g., type III UDs 104) that are not connected to any of the plurality of BSs during the first time period. These are the UDs 104 that could not connect to any of the BSs 102 during the outage event. In this manner, the software allows for service providers to understand the impact of an outage event, whether planned or unplanned. Understanding the impact of the outage event allows for service providers to eliminate or ameliorate the negative impact of the outage event on subscribers. Additionally, the software allows for service providers to provide government reports that require detailed information regarding outage events to government authorities.

Figure 3:
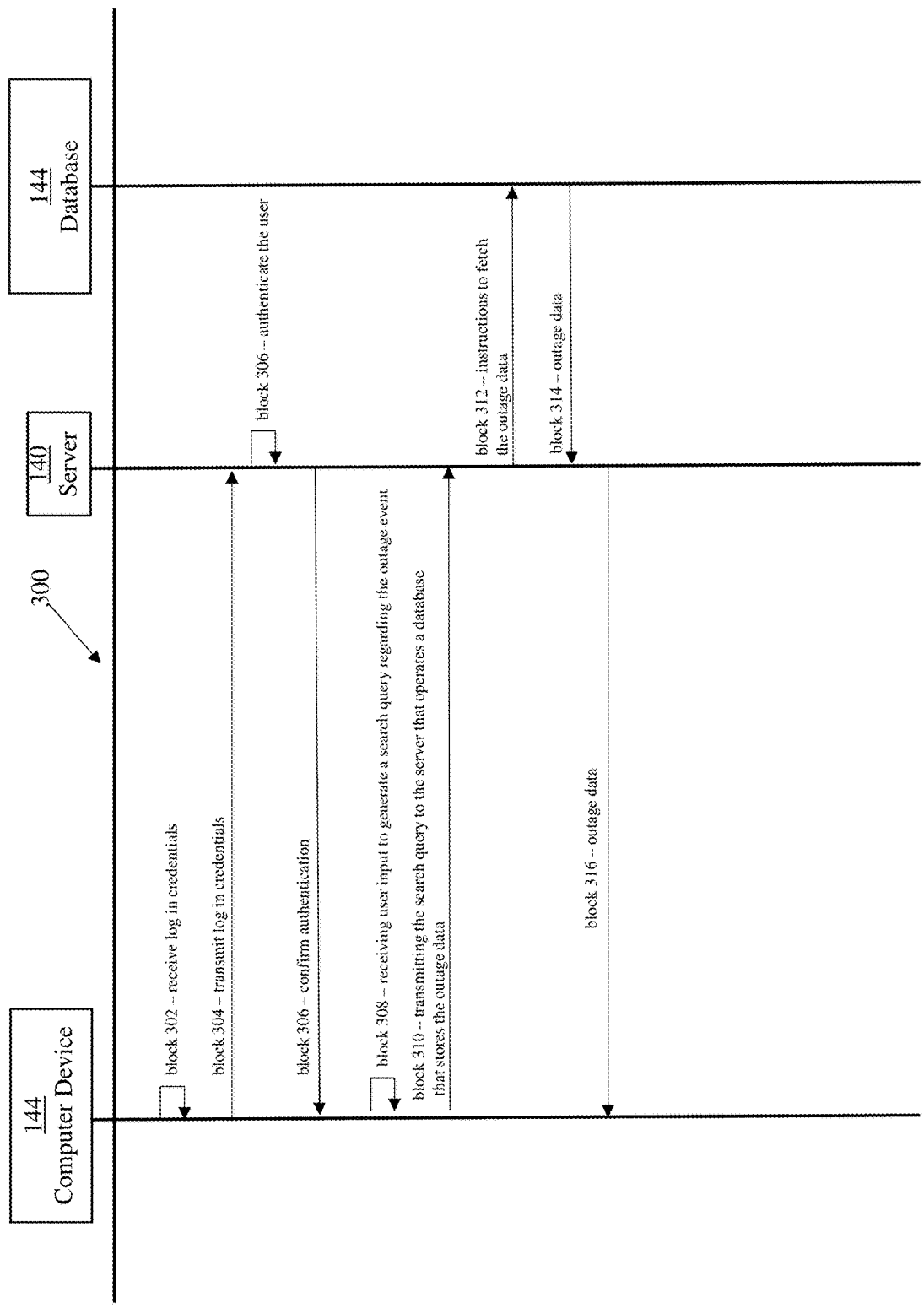
FIG. 3 is a call diagram illustrating one example of procedures for obtaining the outage data.

FIG. 3 is a call diagram 300 illustrating one example of procedures for obtaining the outage data 148.

In this embodiment, a search query is manually provided by a user in order to obtain information about relevant outage events. In some embodiments, the user are members of monitoring teams or operations teams. Blocks 302-316 demonstrate one example of block 202 in FIG. 2. At block 302, the computer device 144 receives log in credentials that allow a user to enter into a user account and access information in the database 142. The log in credentials are sent to the server 140 at block 304. At block 306, the server 140 authenticates the user based on the log in credentials. At block 306, the server 140 confirms authentication of the user through the computer device 144. In this manner, the user gains access to the data stored in the database 142.

At block 308, the computer device 144 receives user input to generate a search query regarding the outage event. In some embodiments, the user input includes relevant search parameters describing or identifying the BS 102A or malfunction related to the outage event at BS 102A. In some embodiments, the search query includes data from the user input in an appropriate format for querying the database 142. The computer device 144 then transmits the search query to the server 140 that operates the database 142 that stores the outage data at block 310. The server 140 then sends instructions to the database to fetch the outage data at block 312. In response, the database 142 transmits the outage data to the server 140 at block 314. At block 316, the server 140 then transmits the outage data to the computer device 144. Accordingly, a user can inspect the outage data and trigger an analysis of the impact of an outage event described by the outage data, as explained in further detail below.

Figure 4:
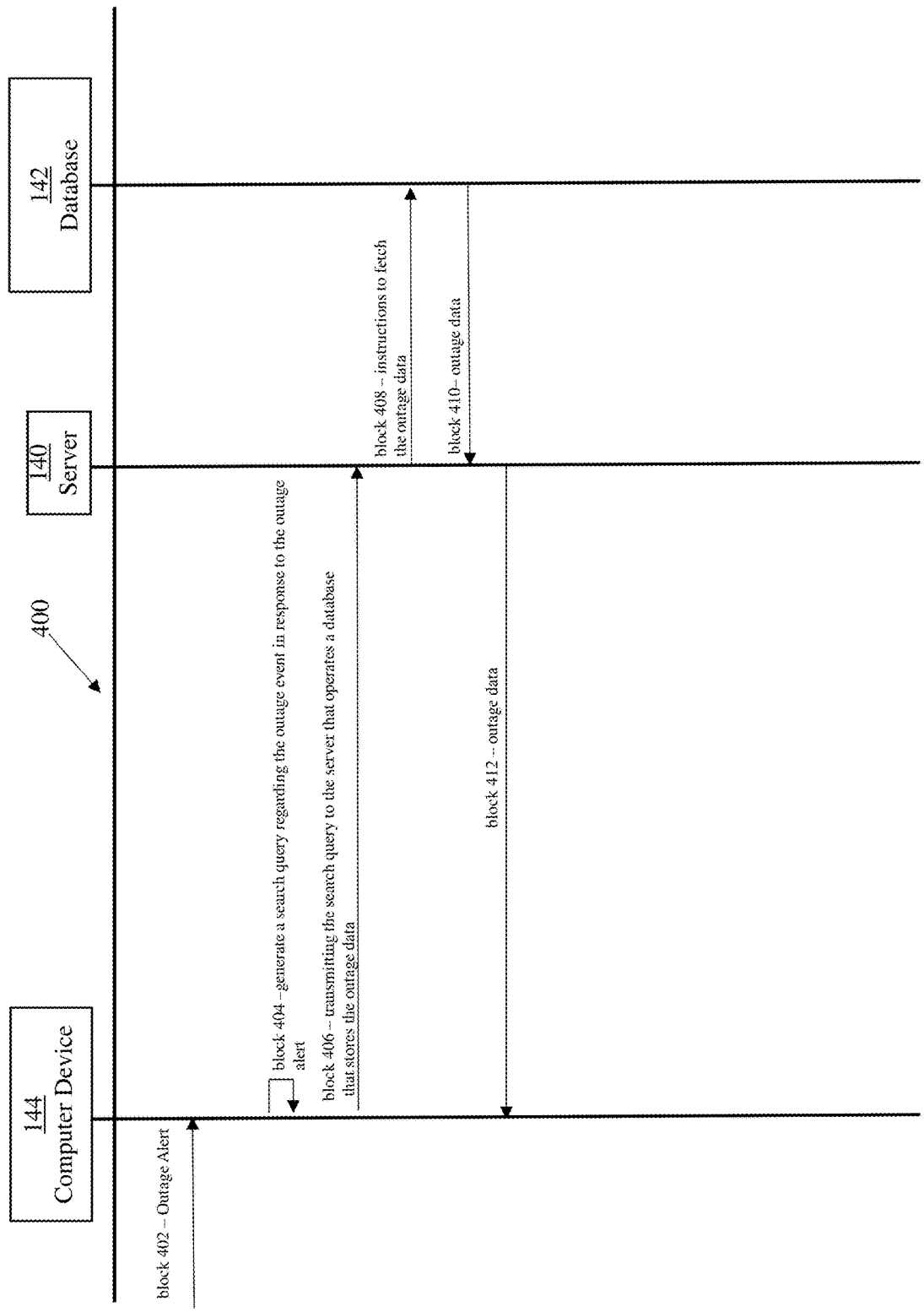
FIG. 4 is a call diagram illustrating another example of procedures for obtaining the outage data.

FIG. 4 is a call diagram 400 illustrating another example of procedures for obtaining the outage data 148.

In this embodiment, a search query is automatically provided in response to an outage alert. Blocks 402-412 demonstrate one example of block 202 in FIG. 2. At block 402, the computer device 144 receives an outage alert regarding the outage event at the BS 102. In some embodiments, the outage alert is automatically generated by a component in the RAN 105 and/or the EPC 120 in response to the outage event.

At block 404, the computer device 144 generates a search query regarding the outage event in response to the outage alert. In some embodiments, the outage alert includes parameters describing or identifying the BS 102A or malfunction related to the outage event at BS 102A. In some embodiments, the search query includes data from the outage alert in an appropriate format for querying the database 142. The computer device 144 then transmits the search query to the server 140 that operates the database 142 that stores the outage data at block 406. At block 408, the server 140 then sends instructions to the database to fetch the outage data. In response, the database 142 transmits the outage data to the server 140 at block 410. At block 412, the server 140 then transmits the outage data to the computer device 144. Accordingly, the outage data triggers an analysis of the impact of an outage event described by the outage data, as explained in further detail below.

Figure 5:
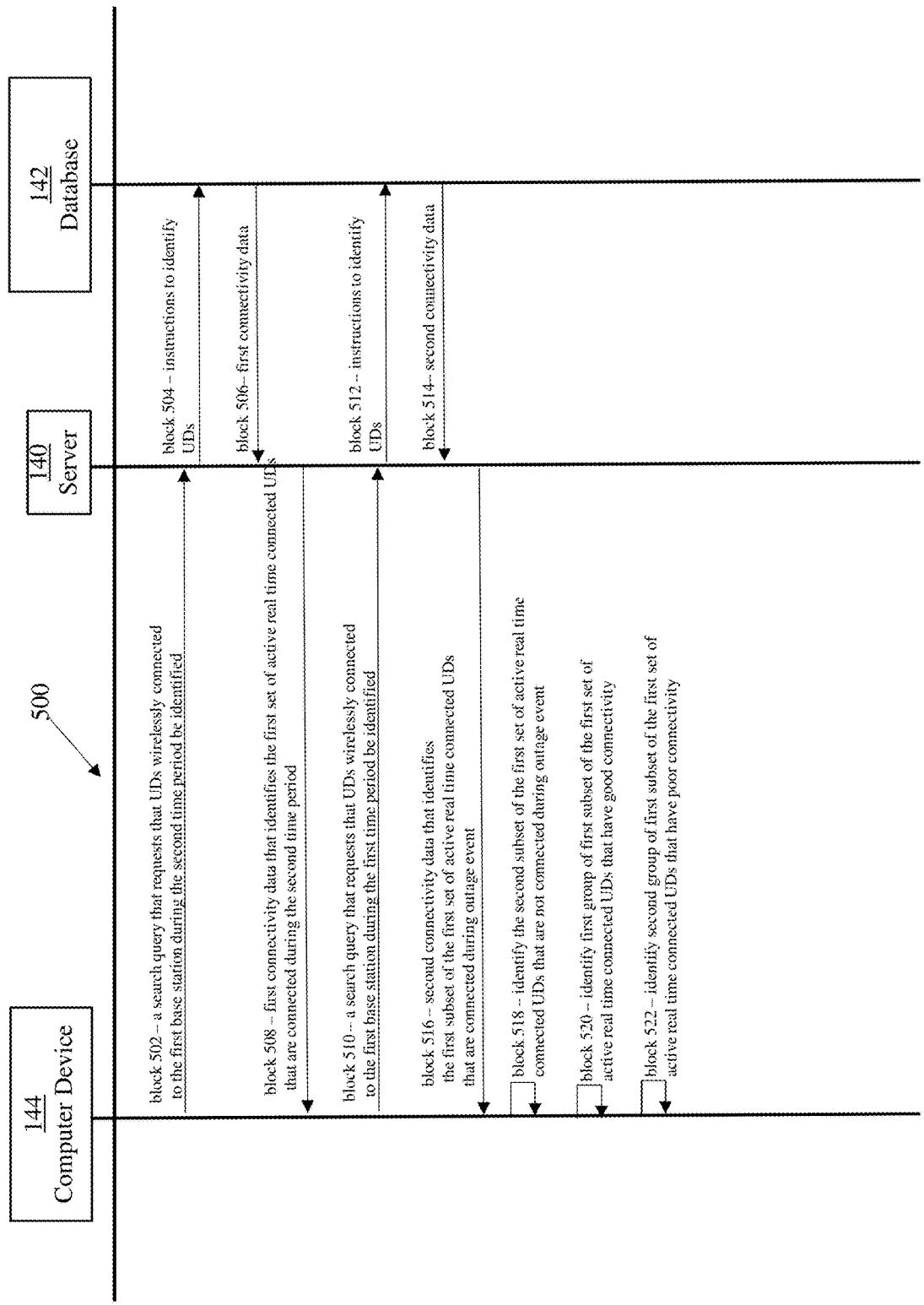
FIG. 5 is a call diagram illustrating one example of procedures analyzing the impact of an outage event at a base station (BS) in a wireless communications network.

FIG. 5 is a call diagram 500 illustrating one example of procedures analyzing the impact of an outage event at the BS 102A in the wireless communications network 100.

Blocks 502-522 are one example of blocks 204-208 in FIG. 2. At f, the computer device 144 transmits a first search query to the server 140 that operates the database 142. The first search query requests that the UDs 104 wirelessly connected to the BS 102A during the second time period (i.e., the time period before the outage event) be identified. The server 140 then sends instructions to the database 142 to identify the UDs 104 wirelessly connected to the BS 102A during the second time period (i.e., the time period before the outage event) at block 504. In response, the database 142 transmits the first connectivity data to the server 140 at block 506. At block 508, the first connectivity data identifies the first set of active real time connected UDs wirelessly connected to the BS 102A during the second time period (i.e., the time period before the outage event) in response to the first search query. Accordingly, blocks 502-508 demonstrate procedures that correspond to procedure 204 in FIG. 2.

At block 510, the computer device 144 transmits a search query to the server 140 that operates the database 142. The search query requests that the UDs 104 wirelessly connected to the plurality of BSs 102 other than the BS 102A during the first time period (i.e., the time period during the outage event) be identified. The server 140 then sends instructions to the database 142 to identify the UDs 104 wirelessly connected to any of the BSs 102 other than be BS 102A during the first time period (i.e., the time period of the outage event) at block 512. In response, the database 142 transmits the second connectivity data to the server 140 at block 514. The second connectivity data identifies the first subset of the first set of active real time connected UDs 104 wirelessly connected to any of the BSs 102 other than the BS 102A during the first time period (i.e., the time period of the outage event) in response to the second search query at block 516. Thus, the second connectivity data identifies the UDs 104 that were able to connect to BSs 102 other than the BS 102A during the outage event. Accordingly, blocks 510-516 demonstrate procedures that correspond to procedure 206 in FIG. 2.

At block 518, the computer device 144 is configured to identify the second subset of the first set of active real time connected UDs that are not connected during the first time period (i.e., the time period during the outage event). In some embodiments, the computer device 144 compares the first connectivity data to the second connectivity data to determine the UDs 104 that were connected to the BS 102A before the outage event and the UDs 104 that are not in identified in the second connectivity data and therefore were unable to connect during the outage event. Accordingly, block 518 demonstrates a procedure that correspond to procedure 208 in FIG. 2.

In some embodiments, the computer device 144 is then configured to analyze the quality of the connection for the UDs 104 that were capable of connection to other BSs 102A during the outage event. In some embodiments, the second connectivity data further includes at least one connectivity quality parameter that indicates a connection quality for each of the first subset of the first set of real time connected UDs 104 to the at least one of the plurality of BSs 102. Examples of a connectivity quality parameter include Reference Signal Received Power (RSRP), Modulation and Coding Scheme (MCS), and/or Channel Quality Index (CQI). More specifically, the computer device 144 is configured to identify a first group in the first subset of first set of real time connected UDs 104 having the at least one connectivity quality parameter being above a first threshold value to indicate good connectivity. At block 520, the computer device 144 identifies a first group in the first subset of first set of real time connected UDs 104 having a connectivity quality parameter above a first threshold value to indicate good connectivity. At block 522, the computer device 144 identifies a second group in the first subset of first set of real time connected UDs 104 having the connectivity quality parameter below the first threshold value or a second threshold value to indicate poor connectivity. In this manner, the quality of the wireless connection of the UDs 104 that managed to connect to other BSs 102 (other than the BS 102A at which the outage event occurred) can be analyzed to determine the impact of the outage event.

For example, in some embodiments, the second connectivity data may include the RSRP of each of the UDs 104 that are connected to BSs 102 (other than the BS 102A at which the outage event occurred) during the outage event. In some embodiments, the UDs 104 are considered to have good connectivity if the RSRP of the UD 104 is above a first threshold hold and poor connectivity if the RSRP is below the first threshold. In some embodiments, the first threshold varies depending on the service provider or in accordance with government regulations. In one example, the RSRP is –90 dBm. Thus, if the UD 104f has an RSRP of above –90 dBm, the UD 104 is considered to have good connectivity and if the UD 104 has an RSRP of less than –90 dBm, the UD 104 is considered to have poor connectivity.

In other embodiments, the UDs 104 are considered to have good connectivity if the RSRP of the UD 104 is above a first threshold hold and poor connectivity if the RSRP is below a second threshold. For example, the UD 104 is considered to have good connectivity if the RSRP of the UD 104 is above –90 dBm and poor connectivity if the RSRP of the UD 104 is below –96 dBm. The 6 dBm of difference is significant is some embodiments because this indicates that channel quality has been reduced by 2 dBm.

Figure 6:
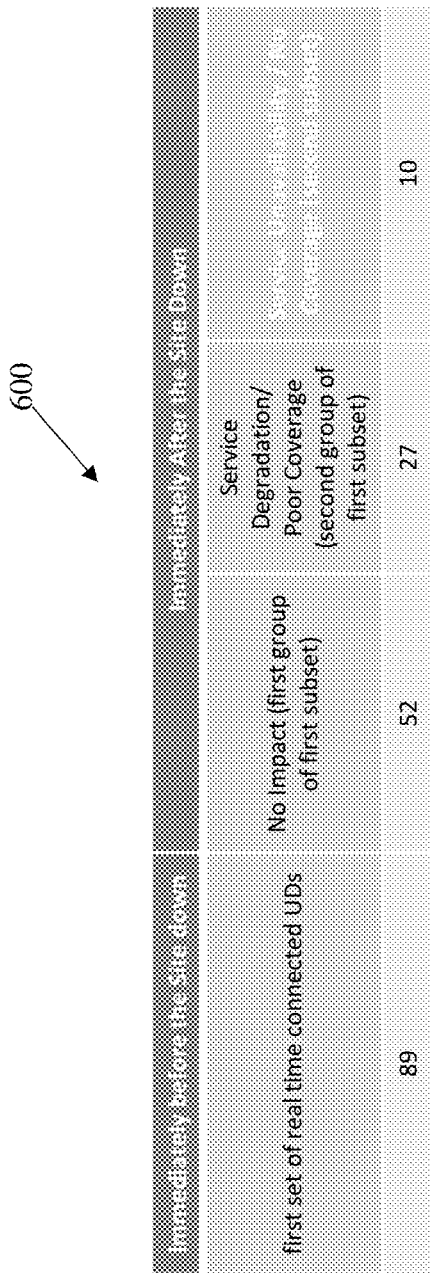
FIG. 6 is a chart that illustrates one example of the results that are determined from the analysis performed as a result of procedures in FIG. 5.

FIG. 6 is a chart 600 that illustrates one example of the results that are determined from the analysis performed as a result of procedures 502-522.

As shown, the first set of active real time connected UDs 104 that were connected to the BS 102A prior to the outage event was 89. The first subset of the first set of UD 104 are the UDs 104 that managed to connect to another BS 102 (other than the BS 102A where the outage event occurred) during the outage event. The first group in the first subset of the first set of UDs 104 are the UDs 104 that had good connectivity at other BSs 102 during the outage event at the BS 102A. In this example, 52 of the 89 UDs 104 had good connectivity during the outage event. The second group in the first subset of the first set of UDs 104 are the UDs 104 that had poor connectivity at other BSs 102 during the outage event at the BS 102A. In this example, 27 of the 89 UDs 104 had poor connectivity during the outage event. Finally, the second subset of the first set of UDs 104 are the UDs 104 that were unable to connect to other BSs 102 during the outage event at the BS 102A. In this example, 10 UDs 104 were unable to wirelessly connect to other BSs 102 and had no wireless coverage on the wireless communications network 100 during the outage event at the BS 102A.

Figure 7:
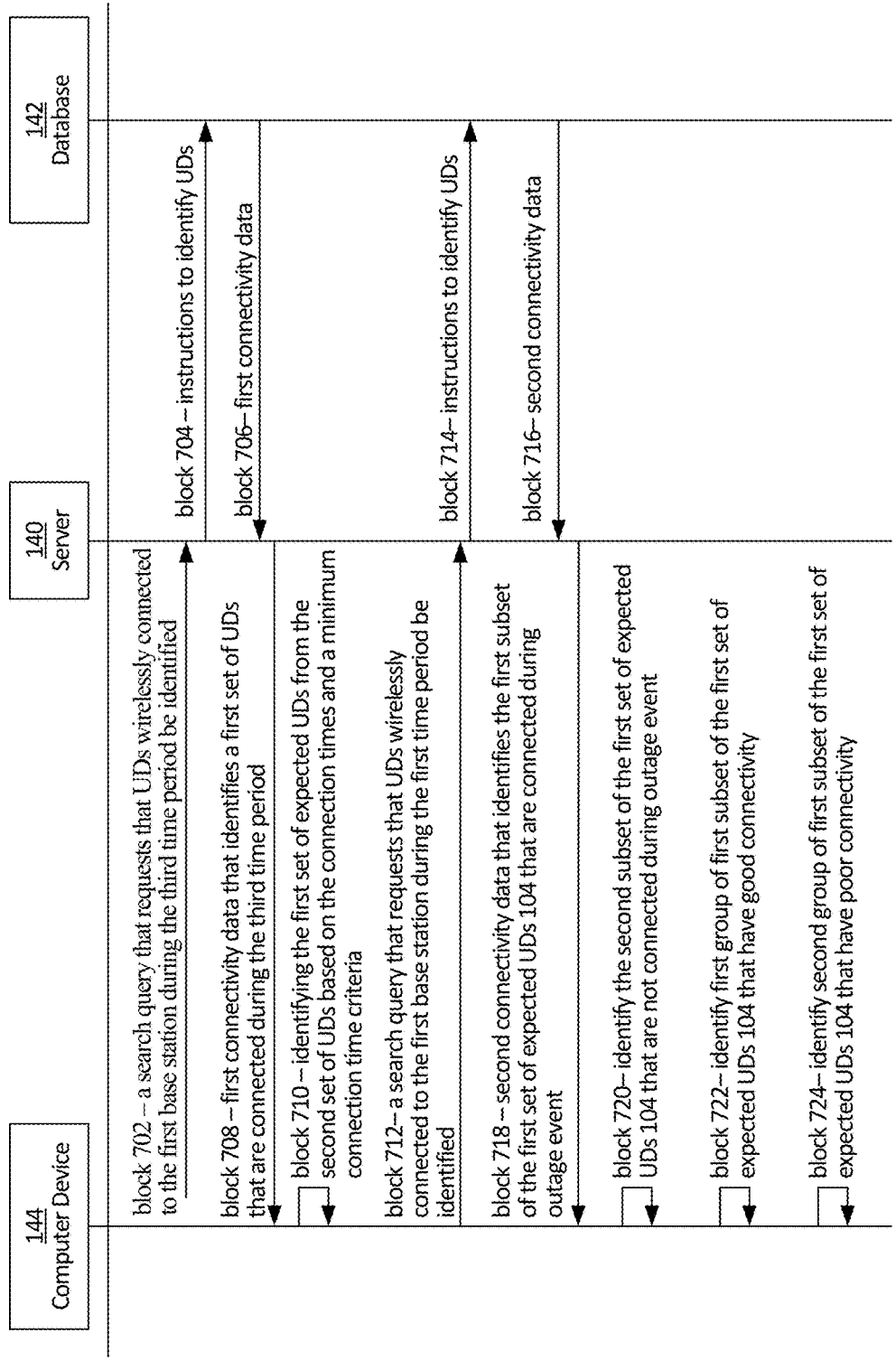
FIG. 7 is a call diagram illustrating one example of procedures analyzing the impact of an outage event at a BS in a wireless communications network.

FIG. 7 is a call diagram 700 illustrating one example of procedures analyzing the impact of an outage event at the BS 102A in the wireless communications network 100.

Blocks 702-724 demonstrate one example of blocks 204-208 in FIG. 2. At block 702, the computer device 144 transmits a first search query to the server 140 that operates the database 142. The first search query requests that the UDs 104 wirelessly connected to the BS 102A during the third time period be identified. The third time window is before the first time period and the third time period has a temporal length greater than the second time period. The third time period is the time period that will provide a population of expected UDs 104. The expected UDs 104 are predicted to wirelessly connected to the BS 102 during the second time period before the outage event. The prediction is based on the historical data that describes the connection of the UDs 104 during the third time period. In some embodiments, the third time period is a certain number of days before the outage event. For example, the third time period can be defined as 15 days before the outage event.

Figure 7A:
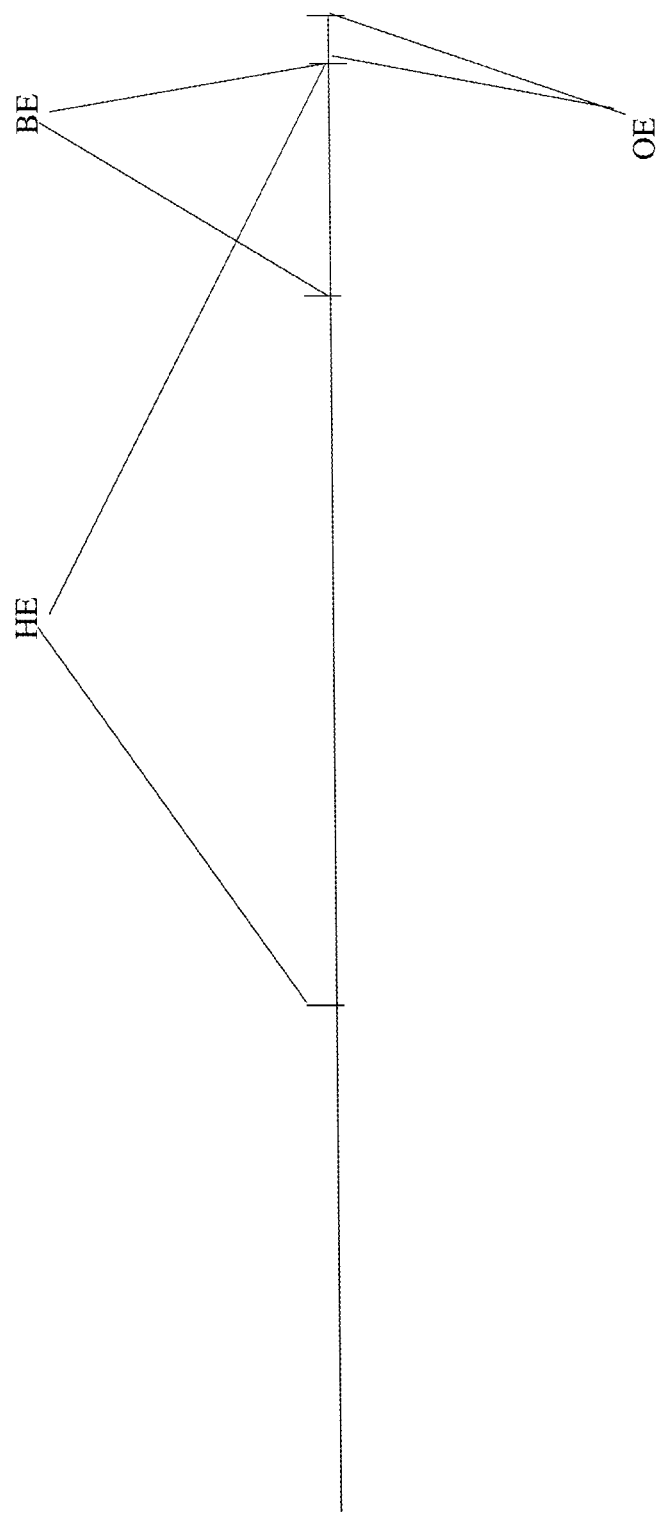
FIG. 7A is a timeline that illustrates an example of the relevant time periods, in accordance with some embodiments.

FIG. 7A is a timeline that illustrates an example of the relevant time periods, in accordance with some embodiments.

In FIG. 7A, time is represented as progressing from left (earlier times) to right (later times). As shown, the first time period OE is the time period of the outage event. This is when the BS 102 is no longer operational due to a malfunction or a scheduled disconnection event. Outage events can last anywhere from minutes to various days depending on the cause of the outage event. The second time period BE is the time period before the first time period OE, i.e., the time period before the outage event. In some embodiments, the UDs 104 connected to the BS during the second time period are the expected UDs 104 that are expected to be connected to the malfunctioning BS during the first time period OE. In this embodiment, the start time of the second time period BE is before the start time of the first time period OE and the end time for the second time period BE is the start time of the first time period OE.

The third time period HE is the time period that is used in some embodiments to provide a population of UD 102. Historical data related to this population of UDs 102 is obtained during the third time period HE. In some embodiments, the third time period HE can be defined as 15 days before the outage event. Connection criteria are then applied to the population of UDs 102 to determine the UDs 102 expected to be connected to the base station BS during the second time period BE. As shown, the third time period HE is before the second time period BE and is longer than the first time period OE. In some embodiments, this is because the third time period has sufficiently long so as to provide time to determine the connection behavior of UDs 102 to the base station.

Referring again to FIG. 7, the server 140 then sends instructions to the database 142 to identify the UDs 104 wirelessly connected to the BS 102A during the third time period (i.e., the time period before the outage event) at block 704. In response, the database 142 transmits first connectivity data to the server 140 at block 706. At block 708, the first connectivity data identifies a second set of user devices wirelessly connected to the BS 102A during the third time period (e.g., 15 days before the outage event) in response to the first search query. The first connectivity data also indicates connection times for each of the second set of user devices during the third time period. The computer device 144 then identifies the first set of expected UDs 104 from the second set of UDs 104 based on the connections times and a minimum connection time criteria, at block 710. Accordingly, blocks 702-710 demonstrate procedures that correspond to procedure 204 in FIG. 2. The first set of expected UDs 104 are the UDs 104 predicted to be connected to the BS 102A during the second time period (e.g., the time period immediately preceding the outage event).

In some embodiments, the minimum connection time criteria is a minimum time per time segment. In one example, the minimum connection time criteria is 5 minutes per day. The computer device 144 then determines the subset from the second set of UDs 104 that were identified in the first connectivity data were connected to the BS 102A for a minimum time per time segment during all the time segments of the third time period. For example, the computer device 144 is configured to determine the first subset of expected UDs 104 from the second set of UDs 104 that were identified in the first connectivity data that were connected a minimum of 5 minutes per day to the BS 102A during the 15 day period prior to the outage event. In some embodiments, the first subset of expected UDs 104 are ranked based on a percentage of connection duration within the coverage area 102A. In some embodiments, a time advance can also be used to determine the first subset of expected UDs 105. For example, in some embodiments, the first connectivity data includes location data for each UD 104 of the second set of the UDs 104. In some embodiments, the computer device 104 is configured to include only those UDs 104 that meet a time advance criteria from the location data as being part of the first subset of expected UDs 105. This eliminates UDs 104 that are merely transients and passing through the coverage area 110A. While transient and passing UDs 104 can experience wireless connectivity loss due to an outage event, the transient and passing UDs 104 are likely to quickly move into another coverage area 110 and establish a wireless connection to another BS 102. In some embodiments, other criteria are used to determine the first set of expected UDs 104 including Cell physical layer identifier (PCI), neighbor PCI & extended Cell Global Identification (eCGI), and/or Handover Success Rate (HOSR) of the BS 102A and the neighboring BSs 102B-102G.

At block 712, the computer device 144 transmits a search query to the server 140 that operates the database 142. The search query requests that the UDs 104 wirelessly connected to the plurality of BSs 102 other than the BS 102A during the first time period (i.e., the time period during the outage event) be identified. The server 140 then sends instructions to the database 142 to identify the UDs 104 wirelessly connected to any of the BSs 102 other than be BS 102A during the first time period (i.e., the time period of the outage event) at block 714. In response, the database 142 transmits the second connectivity data to the server 140 at block 716. The second connectivity data identifies the first subset of the first set of expected UDs 104 wirelessly connected to any of the BSs 102 other than the BS 102A during the first time period (i.e., the time period of the outage event) in response to the second search query at block 718. Thus, the second connectivity data identifies the UDs 104 that were able to connect to BSs 102 other than the BS 102A during the outage event. Accordingly, blocks 712-718 demonstrate procedures that correspond to procedure 206 in FIG. 2.

At block 720, the computer device 144 is configured to identify the second subset of the first set of user devices that are not connected during the first time period (i.e., the time period during the outage event). In some embodiments, the computer device 144 compares the first connectivity data to the second connectivity data to determine the UDs 104 that were connected to the BS 102A before the outage event and the UDs 104 that are not in identified in the second connectivity data and therefore were unable to connect during the outage event. Accordingly, block 720 demonstrates a procedure that correspond to procedure 208 in FIG. 2.

In some embodiments, the computer device 144 is then configured to analyze the quality of the connection for the UDs 104 that were capable of connection to other BSs 102A during the outage event. In some embodiments, the second connectivity data further includes at least one connectivity quality parameter that indicates a connection quality for each of the first subset of the first set of expected UDs 104 to the at least one of the plurality of BSs 102. Examples of a connectivity quality parameter include RSRP, MCS, and/or CQI. More specifically, the computer device 144 is configured to identify a first group in the first subset of first set of expected UDs 104 having the at least one connectivity quality parameter being above a first threshold value to indicate good connectivity. At block 722, the computer device 144 identifies a first group in the first subset of first set of expected UDs 104 having a connectivity quality parameter above a first threshold value to indicate good connectivity. At block 724, the computer device 144 identifies a second group in the first subset of first set of expected UDs 104 having the connectivity quality parameter below the first threshold value or a second threshold value to indicate poor connectivity. In this manner, the quality of the wireless connection of the UDs 104 that managed to connect to other BSs 102 (other than the BS 102A at which the outage event occurred) can be analyzed to determine the impact of the outage event.

Figure 8:
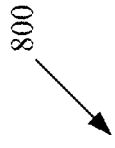
FIG. 8 is a chart that illustrates one example of the results that are determined from the analysis performed as a result of procedures in FIG. 7.

FIG. 8 is a chart 800 that illustrates one example of the results that are determined from the analysis performed as a result of procedures 702-724.

As shown, the first set of expected UDs 104 that are predicted to be connected to the BS 102A prior to the outage event was 88. The first subset of the first set of expected UD 104 are the UDs 104 that managed to connect to another BS 102 (other than the BS 102A where the outage event occurred) during the outage event. The first group in the first subset of the first set of expected UDs 104 are the UDs 104 that had good connectivity at other BSs 102 during the outage event at the BS 102A. In this example, 43 of the 88 UDs 104 had good connectivity during the outage event. The second group in the first subset of the first set of expected UDs 104 are the UDs 104 that had poor connectivity at other BSs 102 during the outage event at the BS 102A. In this example, 33 of the 89 UDs 104 had poor connectivity during the outage event. Finally, the second subset of the first set of expected UDs 104 are the UDs 104 that were unable to connect to other BSs 102 during the outage event at the BS 102A. In this example, 12 UDs 104 were unable to wirelessly connect to other BSs 102 and had no wireless coverage on the wireless communications network 100 during the outage event at the BS 102A.

Figure 9:
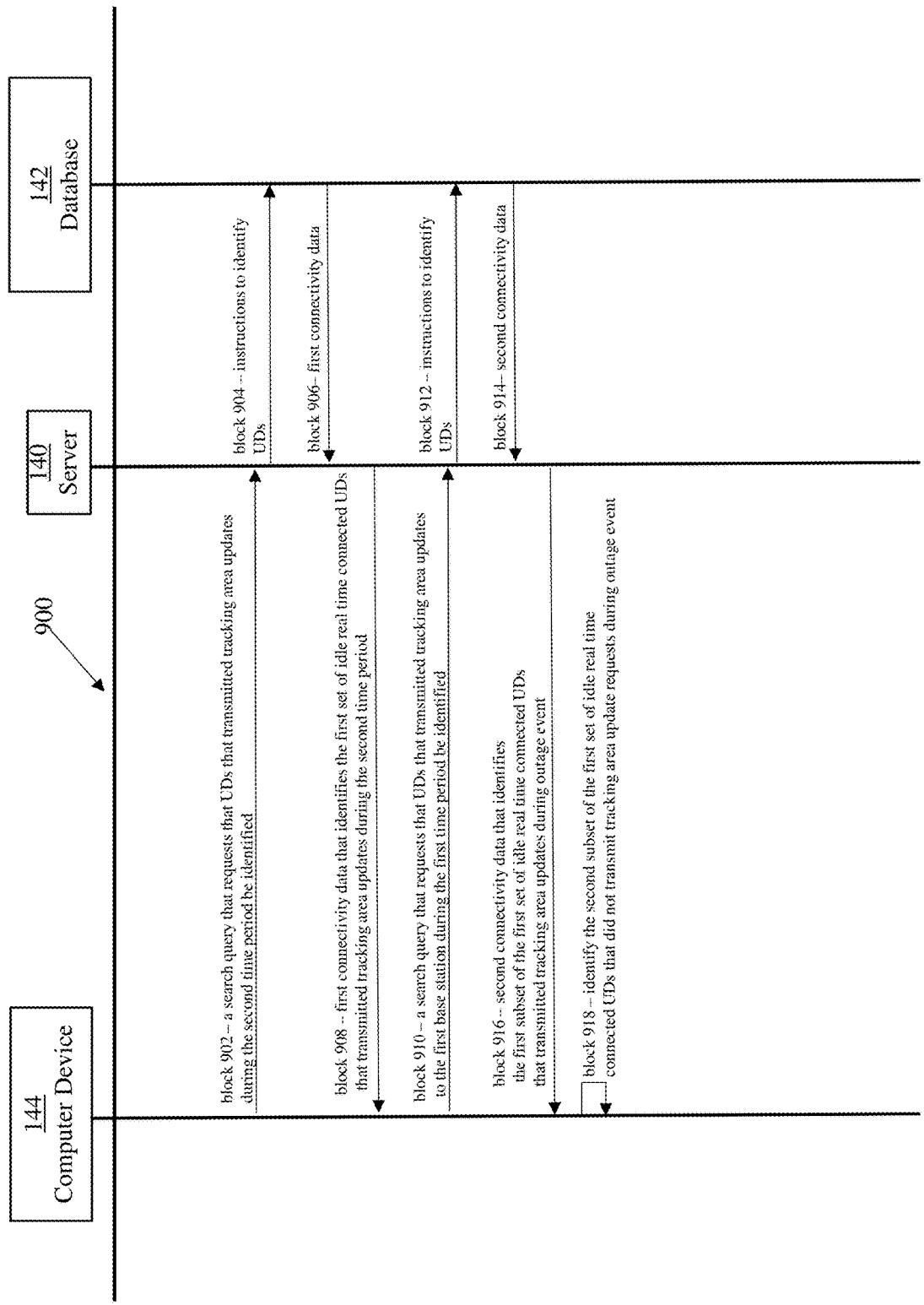
FIG. 9 is a call diagram illustrating one example of procedures analyzing the impact of an outage event at a BS in a wireless communications network.

FIG. 9 is a call diagram 900 illustrating one example of procedures analyzing the impact of an outage event at the BS 102A in the wireless communications network 100.

Blocks 902-922 are one example of blocks 204-208 in FIG. 2. At block 902, the computer device 144 transmits a first search query to the server 140 that operates the database 142. The first search query requests that the UDs 104 that have transmitted the tracking area update request to the BS 102A during the second time period (i.e., time period before the outage event) be identified. Tracking area update request are transmitted periodically by idle UDs 104 that are not actively receiving or transmitting data to update the BS 102A that the UD 103 is still in the coverage area 110A. The server 140 then sends instructions to the database 142 to identify the UDs 104 that transmitted tracking area update requests to the BS 102A during the second time period (i.e., the time period before the outage event) at block 904. In response, the database 142 transmits the first connectivity data to the server 140 at block 906. The first connectivity data identifies the first set of idle real time connected UDs 104 that transmitted tracking area update requests to the BS 102A during the second time period (i.e., the time period before the outage event) in response to the first search query at block 908. Tracking area update requests are transmitted periodically after a defined time period. In some embodiments, tracking area update requests are transmitted once every fifty-nine minutes. Thus, in some embodiments, the first connectivity data identifies the idle UDs 104 that have transmitted a tracking area update request to the BS 102A fifty-nine minutes before the start time of the first time period (i.e., the time period of the outage event). Blocks 902-908 demonstrate procedures that correspond to procedure 204 in FIG. 2.

At block 910, the computer device 144 transmits a search query to the server 140 that operates the database 142. The search query requests that the UDs 104 that transmitted tracking area update requests to the plurality of BSs 102 other than the BS 102A during the first time period (i.e., the time period during the outage event) be identified. In some embodiment, the search query requests that UDs 104 that the UDs 104 that transmitted tracking area update requests to the plurality of BSs 102 other than the BS 102A within a time window (e.g., fifty-nine minutes) from the start time of the first time period (i.e., the time period during the outage event). The server 140 then sends instructions to the database 142 to identify the UDs 104 that transmitted tracking area requests to any of the BSs 102 other than be BS 102A during the first time period (i.e., the time period of the outage event) at block 912. In response, the database 142 transmits the second connectivity data to the server 140 at block 914. The second connectivity data identifies the first subset of the first set of idle real time connected UDs 104 transmitted tracking area update requests to any of the BSs 102 other than the BS 102A during the first time period (i.e., the time period of the outage event) in response to the second search query at block 916. In some embodiments, the second connectivity data identifies the first subset of the first set of idle real time connected UDs 104 transmitting tracking area update requests to any of the BSs 102 other than the BS 102A within a time window (e.g., fifty-nine minutes) of the start time of the first time period (i.e., the time period of the outage event) in response to the second search query. Thus, the second connectivity data identifies the idle UDs 104 that were able to transmit tracking area update requests to BSs 102 other than the BS 102A during the outage event. Accordingly, blocks 910-916 demonstrate procedures that correspond to procedure 206 in FIG. 2.

At block 918, the computer device 144 is configured to identify the first set of idle real time connected UDs that did not transmit tracking area updates during the first time period (i.e., the time period during the outage event). In some embodiments, the computer device 144 compares the first connectivity data to the second connectivity data to determine the UDs 104 that transmitted tracking area update requests to the BS 102A before the outage event and the UDs 104 that are not in identified in the second connectivity data and therefore were unable to transmit tracking area update requests during the outage event. Accordingly, block 918 demonstrates a procedure that correspond to procedure 208 in FIG. 2.

Figure 10:
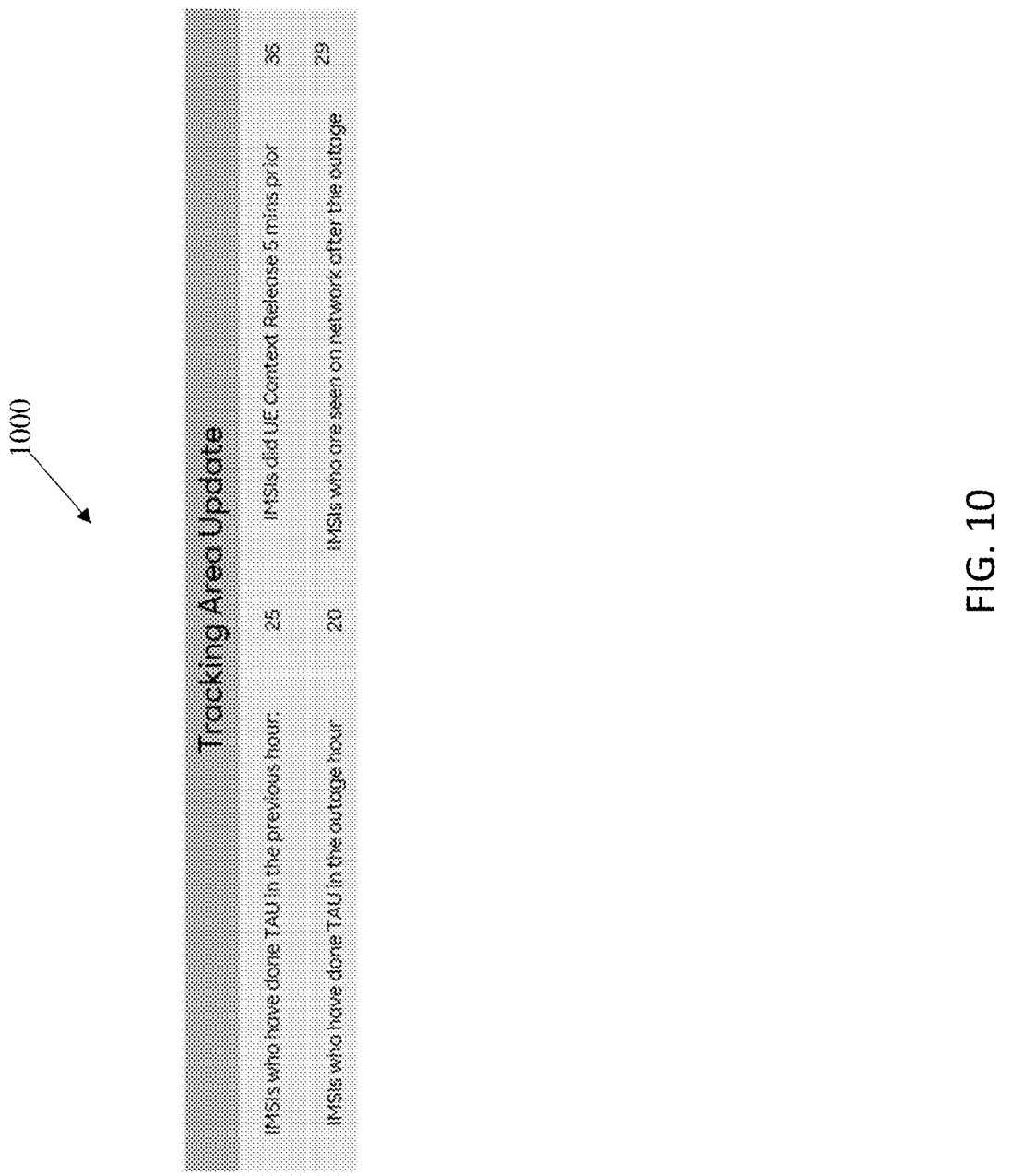
FIG. 10 is a chart that illustrates one example of the results that are determined from the analysis performed as a result of procedures in FIG. 9.

FIG. 10 is a chart 1000 that illustrates one example of the results that are determined from the analysis performed as a result of procedures 902-918.

As shown, the first set of idle real time connected UDs 104 that transmitted tracking area update requests to the BS 102A prior to the outage event was twenty five. The number of idle time connected UDs 104 that transmitted tracking area update requests during the outage event was twenty. Thus, five idle time connected UDs 104 were unable to send tracking area update requests to other BSs 102 during the outage event at the BS 102A.

Figure 11:
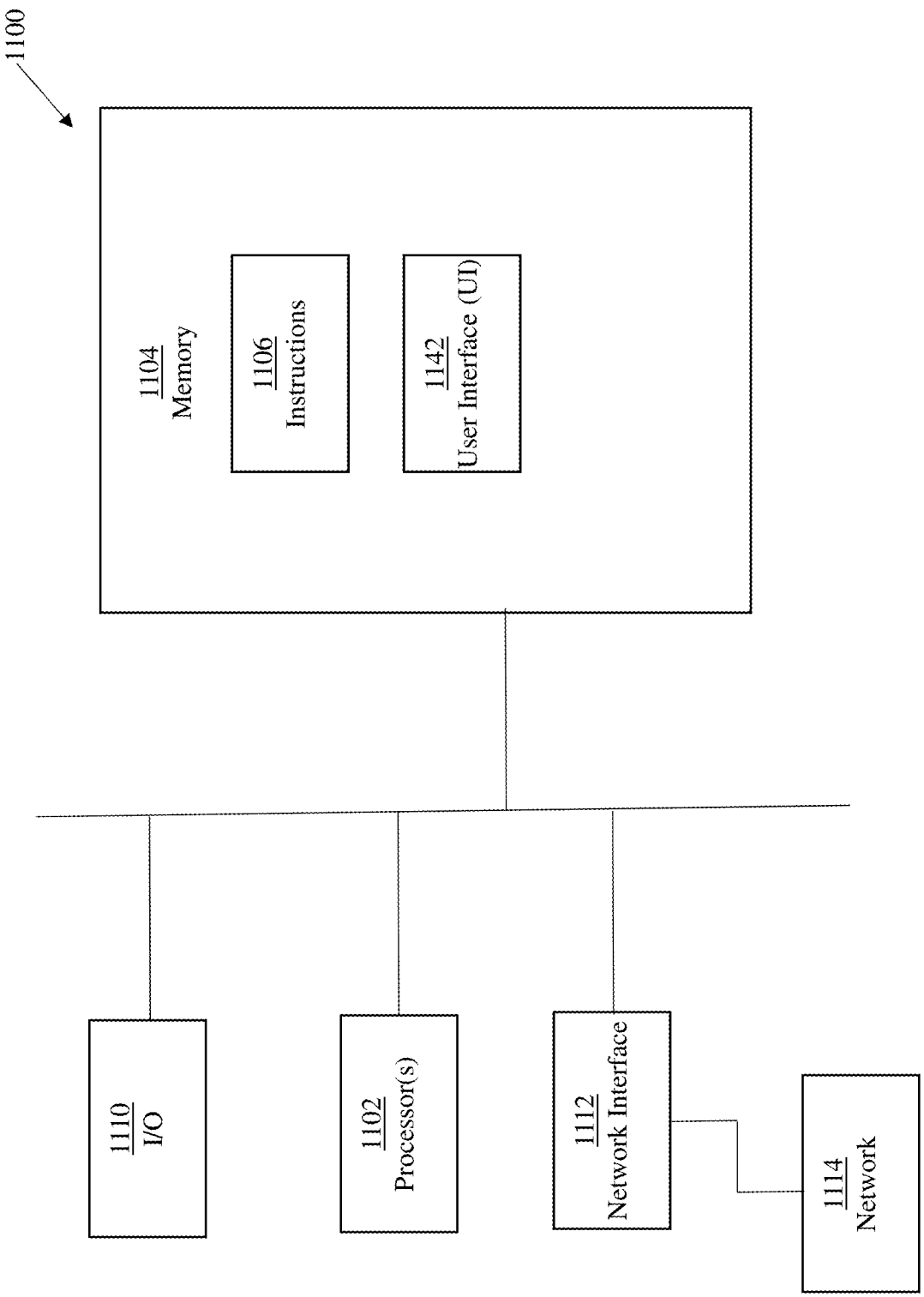
FIG. 11 is a block diagram of a general purpose computer device in accordance with some embodiments.

FIG. 11 is a block diagram of a general purpose computer device 1100 in accordance with some embodiments.

The computer device 1100 to the computer device 144 in FIG. 1, FIG. 3-5, FIG. 6, and FIG. 7 in some embodiments. The computer device 1100 also corresponds to server 140 in FIG. 1, FIG. 3-5, FIG. 6, and FIG. 7 in some embodiments. The computer device 1100 is configured to implement the procedures in blocks 202-208 in FIG. 2, blocks 302-316 in FIG. 3, blocks 402-412 in FIG. 4, blocks 502-522 in FIG. 5, blocks 702-724 in FIG. 7, blocks 902-918 in FIG. 9. In some embodiments, computer device 1100 is a general purpose computing device including at least one hardware processor 1102 and a non-transitory, computer-readable storage medium 1104. Storage medium 1104, amongst other things, is encoded with, i.e., stores, computer program code 1106, i.e., a set of computer-executable instructions. Execution of instructions 1106 by hardware processor 1102 that implements a portion or all of the methods described herein in accordance with one or more embodiments (hereinafter, the noted processes, blocks, procedures, and/or methods). Storage medium 1104, amongst other things computer program code 1106.

Processor 1102 is electrically connected to non-transitory computer-readable storage medium 1104 via a bus 1108. Processor 1102 is also electrically connected to an I/O interface 1110 by bus 1108. A network interface 1112 is also electrically connected to processor 1102 via bus 1108. Network interface 1112 is connected to a network 1114, so that processor 1102 and computer-readable storage medium 1104 are capable of connecting to external elements via network 1114. Processor 1102 is configured to execute computer program code 1106 encoded in computer-readable storage medium 1104 in order to cause system 1100 to be usable for performing a portion or all of the noted processes and/or methods. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, storage medium 1104 stores computer program code 1106 configured to cause computer device 1100 (where such execution represents (at least in part) the EDA tool) to be usable for performing a portion or all of the noted processes and/or methods. In one or more embodiments, storage medium 1104 also stores information which facilitates performing a portion or all of the noted processes and/or methods.

Computer device 1100 includes I/O interface 1110. I/O interface 1110 is connected to external circuitry. In one or more embodiments, I/O interface 1110 includes a keyboard, keypad, mouse, trackball, trackpad, touchscreen, and/or cursor direction keys for communicating information and commands to processor 1102.

Computer device 1100 also includes network interface 1112 connected to processor 1102. Network interface 1112 allows computer device 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1100.

Computer device 1100 is configured to receive information through I/O interface 1110. The information received through I/O interface 1110 includes one or more of instructions, data, and/or other parameters for processing by processor 1102. The information is transferred to processor 1102 via bus 1108. Computer device 1100 is configured to receive information related to a UI through I/O interface 1110. The information is stored in computer-readable medium 1104 as user interface (UI) 1142.

In some embodiments, a method, includes: obtaining, at a computer device, outage data that indicates that an outage event occurred at a first BS of a plurality of BSs and a first time period that the outage event occurred at the first BS; identifying, at the computer device, a first set of user devices that where either a first set of expected user devices that are expected to be connected to the first BS during a second time period or a first set of real time connected user devices that are actively connected to the first base state during the second time period, wherein the second time period is temporally before the first time period; identifying, at the computer device, a first subset of the first set of user devices that are wirelessly connected to any of at least one of the plurality of BSs other than the first BS during the first time period; and identifying, at the computer device, a second subset of the first set of user devices that are not connected to any of the plurality of BSs during the first time period.

In some embodiments, a computer device that includes at least one processor and at least one computer readable medium that stores computer executable instruction, wherein, when the at least one processor executes the at least one computer executable instructions, the at least one processor is configured to: obtain, at a computer device, outage data that indicates that an outage event occurred at a first BS of a plurality of BSs and a first time period that the outage event occurred at the first BS; identify, at the computer device, a first set of user devices that where either a first set of expected user devices that are expected to be connected to the first BS during a second time period or a first set of real time connected user devices that are actively connected to the first base state during the second time period, wherein the second time period is temporally before the first time period; identify, at the computer device, a first subset of the first set of user devices that are wirelessly connected to any of at least one of the plurality of BSs other than the first BS during the first time period; identify, at the computer device, a second subset of the first set of user devices that are not connected to any of the plurality of BSs during the first time period.

In some embodiments, a non-transitory computer readable medium comprising computer executable instructions, which when execute by at least one processor, cause the at least one processor to: obtain, at a computer device, outage data that indicates that an outage event occurred at a first BS of a plurality of BSs and a first time period that the outage event occurred at the first BS; identify, at the computer device, a first set of user devices that where either a first set of expected user devices that are expected to be connected to the first BS during a second time period or a first set of real time connected user devices that are actively connected to the first base state during the second time period, wherein the second time period is temporally before the first time period; identify, at the computer device, a first subset of the first set of user devices that are wirelessly connected to any of at least one of the plurality of BSs other than the first BS during the first time period; identify, at the computer device, a second subset of the first set of user devices that are not connected to any of the plurality of BSs during the first time period.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, a portion or all of the noted processes and/or methods is implemented as a software application that is used by computer device 1100.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    obtain, at a computer device, outage data that indicates that an outage event occurred at a first base station of a plurality of base stations and a first time period that the outage event occurred at the first base station;
    identify, at the computer device, a first set of user devices that include either a first set of expected user devices that are expected to be connected to the first base station during a second time period or a first set of real time connected user devices that are wirelessly connected to the first base station during the second time period, wherein the second time period is temporally before the first time period;

identify, at the computer device, a first subset of the first set of user devices that are wirelessly connected to any of the plurality of base stations other than the first base station during the first time period; and identify, at the computer device, a second subset of the first set of user devices that are not connected to any of the plurality of base stations during the first time period.

2. The method of claim 1, wherein:
the first time period begins at a first start time and ends at a first end time; and
the second time period begins at a second start time before the first start time and ends at a second end time that is approximately at the first start time.

3. The method of claim 1, wherein each of the plurality of base stations is configured to provide wireless communication coverage in a respective geographic coverage area, wherein the geographic coverage area of each of the plurality of base stations partially overlap.

4. The method of claim 1, obtaining, at the computer device, the outage data that indicates that the outage event occurred at the first base station of the plurality of base stations and the first time period that the outage event occurred at the first base station, comprises:
receiving user input to generate a search query regarding the outage event;
transmitting, the search query, from the computer device, to a server that operates a database that stores the outage data; and
receiving the outage data at the computer device from the database in response to the search query.

5. The method of claim 1, wherein obtaining, at the computer device, the outage data that indicates that the outage event occurred at the first base station of the plurality of base stations and the first time period that the outage event occurred at the first base station, comprises receiving an outage alert regarding the outage event;
generating a search query in response to the outage alert;
transmitting, the search query, from the computer device, to a server that operates a database that stores the outage data; and
receiving the outage data at the computer device from the database in response to the search query.

6. The method of claim 1, wherein identifying, at the computer device, the first set of user devices that where either the first set of expected user devices or the first set of real time connected user devices comprises identifying, at the computer device, the first set of user devices that where the first set of real time connected user devices and wherein identifying, at the computer device, the first set of real time connected user devices comprises:
transmitting a first search query from the computer device to a server that operates a database, wherein the first search query requests that user devices wirelessly connected to the first base station during the second time period be identified; and
receiving first connectivity data identifying the first set of real time connected user devices as being wirelessly connected to the first base station during the second time period in response to the first search query.

7. The method of claim 6, wherein identifying, at the computer device, the first subset of the first set of user devices that are wirelessly connected to any of the at least one of the plurality of base stations other than the first base station during the first time period, comprises:
transmitting a second search query from the computer device to the server that operates the database, wherein the second search query requests that user devices wirelessly connected to the plurality of base stations other than the first base station during the first time period be identified; and
receiving second connectivity data identifying the first subset of the first set of real time connected user devices that are wirelessly connected to the at least one of the plurality of base stations other than the first base station during the first time period in response to the second search query.

8. The method of claim 7, wherein the second connectivity data further includes at least one connectivity quality parameter that indicates a connection quality for each of the first subset of the first set of real time connected user devices to the at least one of the plurality of base stations, wherein the method further comprises:
identifying a first group in the first subset of the first set of real time connected user devices having the at least one connectivity quality parameter being above a first threshold value to indicate good connectivity; and
identifying a second group in the first subset of the first set of real time connected user devices having the at least one connectivity quality parameter being below the first threshold value or a second threshold value to indicate poor connectivity.

9. The method of claim 1, wherein identifying, at the computer device, the first set of user devices that where either the first set of expected user devices or the first set of real time connected user devices comprises identifying, at the computer device, the first set of user devices that where the first set of expected user devices and wherein identifying, at the computer device, the first set of user devices that where the first set of expected user devices, comprises:
transmitting a first search query from the computer device to a server that operates a database, wherein the first search query requests that user devices wirelessly connected to the first base station during a third time period be identified, wherein the third time period is before the first time period and the third time period has a temporal length greater than the second time period;
receiving first connectivity data, wherein the first connectivity data identifies a second set of user devices wirelessly connected to the first base station during the third time period in response to the first search query and the first connectivity data indicates connection times for each the second set of user devices during the third time period; and
identifying the first set of expected user devices from the second set of user devices based on the connection times and a minimum connection time criteria.

10. The method of claim 9, wherein identifying, at the computer device, the first subset of the first set of user devices that are wirelessly connected to any of the at least one of the plurality of base stations other than the first base station during the first time period, comprises:
transmitting a second search query from the computer device to the server that operates the database, wherein the second search query requests that user devices wirelessly connected to the plurality of base stations other than the first base station during the first time period be identified; and receiving second connectivity data identifying the first subset of the first set of expected user devices that are wirelessly connected to any of the at least one of the plurality of base stations other than the first base station during the first time period in response to the second search query.

11. The method of claim 10, wherein the second connectivity data further includes at least one connectivity quality parameter that indicates a connection quality for each of the first subset of the first set of expected user devices to the at least one of the plurality of base stations, wherein the method further comprises:
  identifying a first group in the first subset of the first set of expected user devices having the at least one connectivity quality parameter being above a first threshold value to indicate good connectivity; and
  identifying a second group in the first subset of the first set of expected user devices having the at least one connectivity quality parameter being below the first threshold value or a second threshold value to indicate poor connectivity.

12. The method of claim 1, wherein identifying, at the computer device, the first set of user devices that where either the first set of expected user devices or the first set of real time connected user devices comprises identifying, at the computer device, the first set of user devices that where the first set of real time connected user devices and wherein the first set of real time connected user devices comprise a first set of real time connected users that are in an idle mode and have transmitted a tracking area update request during the second time period.

13. The method of claim 12, identifying, at the computer device, the first set of real time connected users that are in an idle mode and have transmitted a tracking area update request during the second time period, comprises:
  transmitting a first search query from the computer device to a server that operates a database, wherein the first search query requests that user devices have transmitted the tracking area update request to the first base station during the second time period be identified; and
  receiving first connectivity data identifying the first set of real time connected user devices having transmitted the tracking area update request to the first base station during the second time period in response to the second search query.

14. The method of claim 13, wherein identifying, at the computer device, the first subset of the first set of user devices that are wirelessly connected to any of the at least one of the plurality of base stations other than the first base station during the first time period, comprises:
  transmitting a second search query from the computer device to the server that operates the database, wherein the second search query requests that user devices that transmitted the tracking area update request to the plurality of base stations other than the first base station during the first time period be identified; and
  receiving second connectivity data identifying the first subset of the first set of real time connected user devices that transmitted a tracking area update request to any of the at least one of the plurality of base stations other than the first base station during the first time period in response to the second search query.

15. The method of claim 1, wherein identifying, at the computer device, the second subset of the first set of user devices that are not connected to any of the plurality of base stations during the first time period, comprises identifying user devices that are members of the first set of user devices but not members of the first subset of the first set of the user devices.

16. A computer device that includes at least one processor and at least one computer readable medium that stores computer executable instructions, wherein, when the at least one processor executes the at least one computer executable instructions, the at least one processor is configured to:
  obtain outage data that indicates that an outage event occurred at a first base station of a plurality of base stations and a first time period that the outage event occurred at the first base station;
  identify a first set of user devices that include either a first set of expected user devices that are expected to be connected to the first base station during a second time period or a first set of real time connected user devices that are wirelessly connected to the first base state during the second time period, wherein the second time period is temporally before the first time period;
  identify a first subset of the first set of user devices that are wirelessly connected to any of the plurality of base stations other than the first base station during the first time period; and
  identify a second subset of the first set of user devices that are not connected to any of the plurality of base stations during the first time period.

17. The computer device of claim 16, wherein:
each of the plurality of base stations is configured to provide wireless communication coverage in a respective geographic coverage area, wherein the geographic coverage area of each of a first subset of the plurality of base stations partially overlaps the geographic coverage area of the first base station; and
the first subset of the first set of user devices that are wirelessly connected to any of at least one of the plurality of base stations other than the first base station comprises a subset of the first set of user devices that are in the geographic coverage area of at least one of the first subset of the plurality of base stations.

18. The computer device of claim 16, where in the at least one processor is configured to obtain, at the computer device, the outage data that indicates that the outage event occurred at the first base station of the plurality of base stations and the first time period that the outage event occurred at the first base station by:
  receiving user input to generate a search query regarding the outage event;
  transmitting, the search query, from the computer device, to a server that operates a database that stores the outage data; and
  receiving the outage data at the computer device from the database in response to the search query.

19. The computer device of claim 16, where in the at least one processor is configured to obtain, at the computer device, the outage data that indicates that the outage event occurred at the first base station of the plurality of base stations and the first time period that the outage event occurred at the first base station by:
  receiving an outage alert regarding the outage event;
  generating a search query in response to the outage alert;
  transmitting, the search query, from the computer device, to a server that operates a database that stores the outage data; and
  receiving the outage data at the computer device from the database in response to the search query.

20. A non-transitory computer readable medium comprising computer executable instructions, which when execute by at least one processor, cause the at least one processor to:
- obtain, at a computer device, outage data that indicates that an outage event occurred at a first base station of a plurality of base stations and a first time period that the outage event occurred at the first base station;
- identify, at the computer device, a first set of user devices that include either a first set of expected user devices that are expected to be connected to the first base station during a second time period or a first set of real time connected user devices that are wirelessly connected to the first base state during the second time period, wherein the second time period is temporally before the first time period;
- identify, at the computer device, a first subset of the first set of user devices that are wirelessly connected to any of the plurality of base stations other than the first base station during the first time period; and
- identify, at the computer device, a second subset of the first set of user devices that are not connected to any of the plurality of base stations during the first time period.

* * * * *